United States Patent
Shum (10) Patent No.: US 10,800,302 B2
(45) Date of Patent: Oct. 13, 2020

(54) METHOD FOR FORMING A VEHICLE REINFORCING MEMBER

(71) Applicant: BASF East Asia Regional Headquarters Ltd., Hong Kong (CN)

(72) Inventor: Andrew C Shum, Singapore (SG)

(73) Assignee: BASF East Asia Regional Headquarters Ltd., Hong Kong (CN)

( * ) Notice: Subject to any disclaimer, the term of this patent is extended or adjusted under 35 U.S.C. 154(b) by 57 days.

(21) Appl. No.: 16/097,462

(22) PCT Filed: Apr. 28, 2017

(86) PCT No.: PCT/CN2017/082407
§ 371 (c)(1),
(2) Date: Oct. 29, 2018

(87) PCT Pub. No.: WO2017/186165
PCT Pub. Date: Nov. 2, 2017

(65) Prior Publication Data
US 2019/0152365 A1     May 23, 2019

(30) Foreign Application Priority Data
Apr. 29, 2016 (SG) .......................... 10201603457W (51) Int. Cl.
*B60N 2/70* (2006.01)
*B60N 2/68* (2006.01)
(Continued)

(52) U.S. Cl.
CPC ............ *B60N 2/7017* (2013.01); *B29C 33/76* (2013.01); *B29C 45/14508* (2013.01);
(Continued)

(58) Field of Classification Search
CPC .......... B60N 2/7017; B60N 2/20; B60N 2/22; B60N 2/4263; B60N 2/64; B60N 2/68;
(Continued)

(56) References Cited

U.S. PATENT DOCUMENTS 4,372,609 A    2/1983    Boisset
5,431,870 A    7/1995    Andre
(Continued)

FOREIGN PATENT DOCUMENTS

CN    103946011 A    7/2014
CN    204488586 U    7/2015
(Continued)

OTHER PUBLICATIONS

Extended European Search Report dated Sep. 25, 2019 in Patent Application No. 17788817.9, 3 pages.
(Continued)

*Primary Examiner* — Mark R Wendell
(74) *Attorney, Agent, or Firm* — Oblon, McClelland, Maier & Neustadt, L.L.P.

(57) ABSTRACT

A method for forming a vehicle reinforcing member (26, 28, 30). The method includes conforming a planar body of fibre reinforced material (CFRM) (504), such as a sheet or unidirectional tape, to a shape of a shape defining member (506, 900). In effect, the shape defining member (506, 900) is a core that defines an internal volume of a closed cross-section portion of the vehicle reinforcing member (26, 28, 30). The CFRM material (504) comprises continuous fibres in a synthetic matrix. The method further includes bonding a first edge portion (510) of the CFRM body (504) to a second edge portion (512) of the CFRM body (504) thereby to form the closed cross-section portion of the vehicle reinforcing member (26, 28, 30). An apparatus (800) for implementing the method, and components (e.g. vehicle
(Continued)

reinforcing members (26, 28, 30), vehicle seats (10) and so forth) formed using the method are also described.

26 Claims, 6 Drawing Sheets (51) Int. Cl.
  *B29C 53/42* (2006.01)
  *B29C 53/82* (2006.01)
  *B29C 70/72* (2006.01)
  *B29C 53/46* (2006.01)
  *B29C 45/14* (2006.01)
  *B60N 2/22* (2006.01)
  *B60N 2/42* (2006.01)
  *B29C 70/00* (2006.01)
  *B29C 33/76* (2006.01)
  *B29C 53/84* (2006.01)
  *B60N 2/20* (2006.01)
  *B60N 2/64* (2006.01)
  *B29L 31/00* (2006.01)
  *B29K 105/08* (2006.01)
  *B29K 105/10* (2006.01)
  *B29L 31/30* (2006.01)

(52) U.S. Cl.
  CPC .. *B29C 45/14631* (2013.01); *B29C 45/14786* (2013.01); *B29C 45/14811* (2013.01); *B29C 53/42* (2013.01); *B29C 53/46* (2013.01); *B29C 53/82* (2013.01); *B29C 53/84* (2013.01); *B29C 70/00* (2013.01); *B29C 70/72* (2013.01); *B60N 2/20* (2013.01); *B60N 2/22* (2013.01); *B60N 2/4263* (2013.01); *B60N 2/64* (2013.01); *B60N 2/68* (2013.01); *B60N 2/686* (2013.01); *B29C 2045/14057* (2013.01); *B29K 2105/0845* (2013.01); *B29K 2105/101* (2013.01); *B29L 2031/30* (2013.01); *B29L 2031/3055* (2013.01); *B29L 2031/771* (2013.01)

(58) Field of Classification Search
  CPC ......... B60N 2/686; B29C 70/00; B29C 70/72; B29C 33/76; B29C 53/82; B29C 53/84; B29C 45/14508; B29C 45/14631; B29C 45/14786; B29C 45/14811; B29C 2045/14057; B29K 2105/0845; B29K 2105/101; B29L 2031/30; B29L 2031/3055; B29L 2031/771
  USPC .................................................... 297/354.12
  See application file for complete search history.

(56) References Cited

U.S. PATENT DOCUMENTS

| | | | |
|---|---|---|---|
| 5,567,509 A | 10/1996 | Gautier | |
| 5,851,619 A | 12/1998 | Sakai et al. | |
| 10,076,864 B2* | 9/2018 | Flock | B29C 51/002 |
| 2010/0270700 A1 | 10/2010 | Jumel | |
| 2011/0316320 A1* | 12/2011 | Kulkarni | B60N 2/682 |
| | | | 297/452.48 |
| 2013/0320742 A1* | 12/2013 | Murolo | B60N 2/68 |
| | | | 297/452.18 |
| 2015/0140242 A1 | 5/2015 | Flock et al. | |
| 2016/0009009 A1 | 1/2016 | Grumm | |
| 2018/0126885 A1* | 5/2018 | Hartmann | B60N 2/686 |
| 2019/0152100 A1* | 5/2019 | Rubsam | B29C 45/1418 |
| 2020/0009949 A1* | 1/2020 | Tichy | B29C 66/112 |

FOREIGN PATENT DOCUMENTS

| | | |
|---|---|---|
| CN | 105121118 A | 12/2015 |
| EP | 0 029 763 A1 | 6/1981 |
| EP | 0 247 359 A2 | 12/1987 |
| EP | 2 243 617 A1 | 10/2010 |
| JP | 9-109240 A | 4/1997 |
| WO | WO 2016/016662 A1 | 2/2016 |

OTHER PUBLICATIONS

International Search Report dated Aug. 2, 2017, in PCT/CN2017/082407, filed Apr. 28, 2017.

* cited by examiner

METHOD FOR FORMING A VEHICLE REINFORCING MEMBER

TECHNICAL FIELD

The present application claims priority to Singapore patent application 10201603457W filed on 29 Apr. 2016.

TECHNICAL FIELD

The present disclosure relates to methods for forming vehicle reinforcing members such as vehicle seat frames. The present disclosure also relates to vehicle reinforcing members formed by such methods and components of vehicles incorporating vehicle reinforcing members.

BACKGROUND

In the automotive industry, the need to balance speed and performance against safety is a significant factor. In order to improve safety, additional safety measures, such as airbags and crumple zones, are incorporated into the vehicle.

Additional safety measures typically add weight to the vehicle, which results in higher fuel consumption and competes against industry requirements to reduce overall pollutant generation.

To reduce weight, metal components have been replaced with composite reinforced materials. These components are often formed in what is known as a 2½ dimensional configuration. To create a 2½ dimensional component, a flat sheet or layers of sheets of pre-cut woven fibres is impregnated with a synthetic resin—known as a "prepreg"—and folded into a V, L, C, U, M or other shape of mostly uniform thickness corresponding to the thickness of the prepreg. This improves the strength of the formed component and provides attachment points by which the composite reinforced material component can be attached to other components. The 2½ dimensional parts is then typically overmolded with a plastic to provide rib reinforcements and to add attachment points.

It is typically very costly to use composite reinforced materials in a way that maintains the necessary strength of the relevant component, particularly for structural and safety applications, and to install components fabricated from those materials. The result is that, in the case of mainly 2½ dimensional structures, there has been limited weight reduction with use of composite reinforced materials, while the installed cost of composite reinforced material components adds to the cost of the vehicle.

To be suitable for mass production volumes suitable for affordably priced vehicles, it is desirable that there be provided a method to efficiently fabricate components from composite reinforced material that facilitates weight reduction while being easy to manufacture and maintains the necessary strength of the component.

SUMMARY

According to various embodiments, a method for forming an overmoulded assembly may be provided. The method may include: conforming a planar body of fibre reinforced material (CFRM) to a shape of a shape defining member, the material comprising continuous fibres in a synthetic matrix and the shape defining member defining an internal volume of a closed cross-section portion of a vehicle reinforcing member; bonding a first edge portion of the CFRM body to a second edge portion of the CFRM body thereby to form, around the shape defining member, the closed cross-section portion of the vehicle reinforcing member; and overmoulding a shell onto the vehicle reinforcing member and a further vehicle reinforcing member to integrally connected the shell and CFRM body, while keeping the shape defining member in the closed-cross-section portion.

According to various embodiments, a system for fabricating an overmoulded assembly may be provided. The system may include: a shape defining member defining an internal volume of a closed cross-section portion of a vehicle reinforcing member, the vehicle reinforcing member formed, in use, from a planar body of continuous fibre reinforced material (CFRM) comprising continuous fibres in a synthetic matrix; a first mould member, the first mould member and shape defining member being configured to be brought together to with the CFRM body therebetween, to form a closed cross-section portion from the CFRM body, the closed cross-section portion being formed around the shape defining member; a bonding device movably mounted to the first mould member and movable towards the shape defining member in use to bond a first edge portion and a second edge portion of the CFRM body together to form the vehicle reinforcing member; and an overmoulding mould for use in overmoulding a shell onto the vehicle reinforcing member and a further vehicle reinforcing member to integrally connected the shell and CFRM body, while keeping the tapered shape defining member in the closed-cross-section portion.

In an example, a method for forming a vehicle reinforcing member may be provided. The method may include:
  conforming a sheet of fibre reinforced material (CFRM) to a shape of a shape defining member, the material comprising continuous fibres in a synthetic matrix and the shape defining member defining an internal volume of a closed cross-section portion of the vehicle reinforcing member; and
  bonding a first edge portion of the CFRM sheet to a second edge portion of the CFRM sheet thereby to form the closed cross-section portion of the vehicle reinforcing member.

In an example, a vehicle reinforcing member manufactured using the method described above or elsewhere herein may be provided. The vehicle reinforcing member may include a closed cross-section portion and a seam joining the first and second edge sections.

In an example, a method of manufacturing a reinforcing structural member of a vehicle seat may be provided. The vehicle seat may include a seat portion and a seatback connected to the seat portion by a tilt adjustment mechanism. The tilt adjustment mechanism may include two movably connected tilt adjustment members moveable relative to each other to allow tilt adjustment of the seatback relative to the seat portion, one of the two tilt adjustment members being on each of the seat portion and seatback. The method may include:
  forming a vehicle reinforcing member of a seat element using the methods described above or elsewhere herein, the seat element being one of the seat portion and seatback; and
  attaching one of the two tilt adjustment members to the vehicle reinforcing member for connecting the vehicle reinforcing member to the other of the two tilt adjustment members and thereby to connect the seat portion and seatback.

In an example, a vehicle seat may be provided. The vehicle seat may include:
  a seat portion;

a seatback;

a tilt adjustment mechanism connecting the seatback to the seat portion, the tilt adjustment mechanism comprising two movably connected tilt adjustment members moveable relative to each other to allow tilt adjustment of the seatback relative to the seat portion, one of the two tilt adjustment members being on each of the seat portion and seatback, wherein a seat element, the seat element being one of the seatback and seat portion, comprises at least one vehicle reinforcing member formed using the method described above or elsewhere herein, the at least one vehicle reinforcing member comprising one of the tilt adjustment members movably connected to the other tilt adjustment member thereby to connect the seat portion and seatback.

In an example, a vehicle seat may be provided. The vehicle seat may include:

a seat portion;

a seatback;

a tilt adjustment mechanism connecting the seatback to the seat portion, the tilt adjustment mechanism comprising two movably connected tilt adjustment members moveable relative to each other to allow tilt adjustment of the seatback relative to the seat portion, one of the two tilt adjustment members being on each of the seat portion and seatback, wherein a seat element, the seat element being one of the seatback and seat portion, is formed according to the method described above or elsewhere herein, the at least one vehicle reinforcing member comprising one of the tilt adjustment members movably connected to the other tilt adjustment member thereby to connect the seat portion and seatback.

In an example, a system for fabricating a vehicle reinforcing member may be provided. The system may include:

a shape defining member defining an internal volume of a closed cross-section portion of the vehicle reinforcing member, the vehicle reinforcing member formed, in use, from a sheet of continuous fibre reinforced material (CFRM) comprising continuous fibres in a synthetic matrix;

a first mould member, the first mould member and shape defining member being configured to be brought together to with the CFRM sheet therebetween, to at least partially conform the CFRM sheet to the shape defining member; and a bonding device movably mounted to the first mould member and movable towards the shape defining member in use to bond a first edge portion and a second edge portion of the sheet together to form the vehicle reinforcing member.

BRIEF DESCRIPTION OF THE DRAWINGS

Some embodiments will now be described by way of non-limiting example only. The embodiments are described with reference to the drawings in which.

DETAILED DESCRIPTION

Embodiments disclosed herein provide vehicle reinforcing members with 3-dimensional, closed cross-section portions. Such members can be particularly suited to applications in vehicle seats and bumper bars, as well as other safety, energy absorbing and reinforcing applications. Notably, due to the high strength of components formed in accordance with the methods described herein, they may also be used in structural applications—for example, in replacing components of a vehicle chassis.

The described embodiments employ "continuous" fibres insofar as fibres can extend unbroken around a closed cross-section portion of the vehicle reinforcing member. In other words, the vehicle reinforcing members are formed such that if a planar body of woven fibres or uni-directional tape is oriented with fibres or tapes extending around the closed cross-section portion of the relevant vehicle reinforcing member, the fibres will extend, unbroken, around the full periphery of the closed cross-section and terminate either where it started or to have its ends overlap.

The CFRM material described herein comprises a planar body with continuous fibres. That planar body may comprise one or more sheets (e.g. 1 sheet, two sheets and so on) of continuous fibres or unidirectional tapes (e.g. one tape, two tapes and so on) in a synthetic matrix. Where multiple sheets or tapes are provided, at least two of the sheet or tapes may be in an overlapping configuration. Where two or more sheet or tapes are provided, at least one of the sheet or tapes may be oriented with continuous fibres extending in a direction other than around the closed cross-section portion of the vehicle reinforcing member—for example, the at least one sheet to tape may have fibres extending perpendicular, at 45°, at 30°, at 15°, at 10° at 5° or any other angle to the fibres of sheets or tapes extending around the closed cross-section portion.

Figure 1:
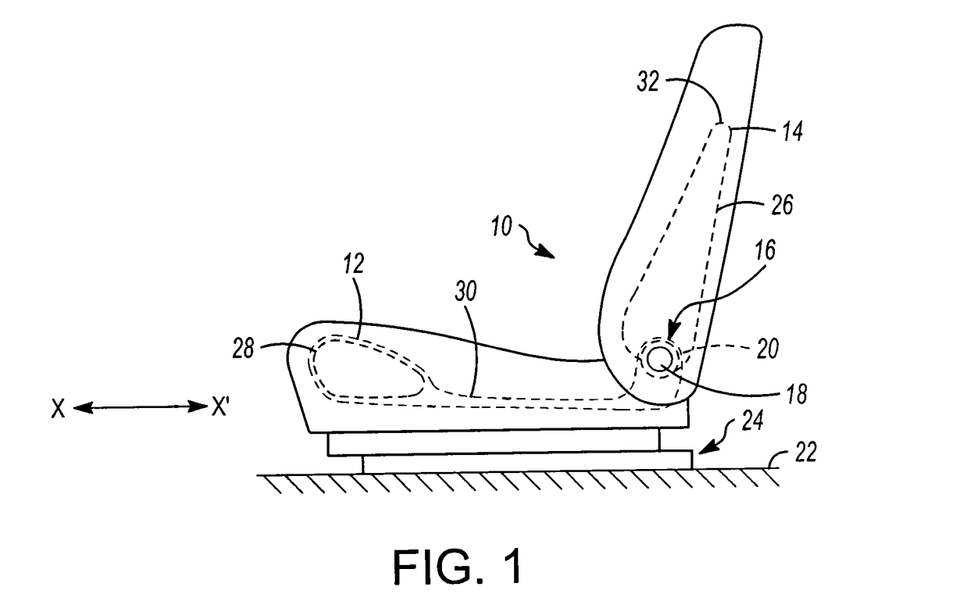
FIG. 1 is a side view of a vehicle seat in accordance with present teachings.

FIG. 1 shows a vehicle seat 10. The vehicle seat 10 may be a front seat of a car or middle seat of a multi-row vehicle such as a SUV or a MPV, an aeroplane passenger seat or other seat as appropriate. The vehicle seat 10 comprises a seat portion 12 and a seatback 14—each of the seat portion 12 and seatback 14 may be interchangeably referred to as a "seat element". The vehicle seat 10 further comprises a tilt adjustment mechanism 16. The tilt adjustment mechanism 16 connects the seatback 14 to the seat portion 12. There may be other components also assisting connection between the seatback 14 and seat portion 12.

The seat portion 12 is mounted on the floor 22 of the vehicle, separated from the floor 22 by a seat base 24. The seat portion 12 may be fixedly mounted to the floor 22 through the seat base 24, for example when the vehicle seat 10 is a seat of a passenger aircraft. The seat portion 12 may alternatively be mounted to the floor through a seat base 24 comprising a longitudinal adjustment mechanism. A longitudinal adjustment mechanism allows selective longitudinal adjustment of the longitudinal position of the vehicle seat 10—in the direction of arrows X-X'.

The tilt adjustment mechanism 16 comprises two movably connected tilt adjustment members or brackets 18, 20. The tilt adjustment members 18, 20 are moveable relative to each other to allow tilt adjustment of the seatback 14 relative to the seat portion 12. To this end, one of the two tilt adjustment members 18, 20 is on each of the seat portion 12 and seatback 14.

At least one vehicle reinforcing member 26, 28, 30 (members 26 and 28 being shown in dashed, broken lines and member 30 being shown in dotted broken lines) may be provided in one or both of the seat elements—in other words in one of the seat portion 12 and seatback 14—or even in the seat base 24 or structure supporting the floor 22. Since the vehicle reinforcing members 26, 28, 30 (and other members as described herein) form part of the vehicle seat, the term "vehicle reinforcing member" may be used interchangeably with "seat reinforcing member" as appropriate. Presently, three such vehicle reinforcing members 26, 28, 30 are shown to provide exemplary illustration of where such members may be used. The vehicle reinforcing members 26, 28, 30 are formed, for example, using the process steps shown in FIGS. 5a to 5d.

In each case, the vehicle reinforcing members 26, 28, 30 are provided to substitute for a traditional reinforcing or structural member. In most cases, the relevant vehicle reinforcing member will also form part of a safety system. For example, the vehicle reinforcing member 28 in the seat portion 12 is mounted to the main structure of the vehicle via the floor 22. In the present case, the seat portion 12 is mounted to the floor 22 via mechanism 24 as discussed above. In the event of a front end collision with the vehicle, the inertia of an occupant sitting in the seat 10 will try to propel the occupant forward in the direction of arrow X. The occupant's bottom will push against the vehicle reinforcing member 28, which will absorb some of the occupant's inertia.

In so doing, the vehicle reinforcing member 28 provides structural reinforcement to other components of the seat portion 12, yet also performs the safety function of absorbing forward energy of an occupant sitting in the seat 10, preventing the occupant from "submarining" underneath the seatbelt during a frontal collision.

Similarly, the vehicle reinforcing member 26 in the seatback 14 is mounted, via the tilt adjustment mechanism 16, to the seat portion 12. In the event of a rear impact with the vehicle, the occupants' inertia will push them into the seatback 14 in the direction of X'. The vehicle reinforcing member 26 will absorb some of the force imparted by the occupant to the seat 10, but will transfer a significant proportion of that force through the tilt adjustment mechanism 16 into the seat portion 12. The seat portion 12 will similarly transfer some of that force into the floor 22 of the vehicle and so on.

Again, the vehicle reinforcing member 26 reinforces the structure of the seatback 14 of the seat 10, yet also performs safety functions. In particular, during a rear end collision energy is transferred from an occupant into the seatback 14, from the seatback 14 into the tilt adjustment mechanism 18, 20, then on into the seat portion 12 and from the seat portion 12 into the floor 22 of the vehicle. Other force is absorbed during deformation of the vehicle reinforcing member 26 and other components of the vehicle seat 10. The vehicle reinforcing member 26 also maintains the structure of the seatback 14.

It will be appreciated the phrases "maintaining the structure", "maintaining the shape" and similar, when used in terms of collision and destructive events, may include within their scope some change in the shape or structure of the seat 10 but not to the extent that an occupant will be severely injured by that change under tests performed according to relevant safety standards. In other words, those phrases include within their scope the ability of the seat to sufficiently maintain its shape and structure to ensure the safety of the occupant, even where the seat is destroyed (i.e. no longer be fit for purpose) in an accident. The phrase "maintain the structure" is not intended to limit the seat 10 to necessarily being capable of withstanding collisions while remaining operational.

The vehicle reinforcing member 26 comprises one of the tilt adjustment members 18, 20 and vehicle reinforcing member 30 comprises the other of the tilt adjustment members 18, 20. In particular, vehicle reinforcing member 26 comprises tilt adjustment member 20. The tilt adjustment members 18, 20 are movably connected, thereby to connect the seat portion 12 and seatback 14. In other words, member 18 can be locked to member 20 in a variety of tilt positions, and can be selectively moved between those positions.

The vehicle reinforcing member 26 extends from the tilt adjustment member 18 (which forms part of a hinge mechanism enabling rotation to tilt the seatback 14 relative to the seat portion 12) to a point further away from the respective tilt adjustment member 18 (i.e. to a point further away from the relevant hinge mechanism). The vehicle reinforcing member 26 of the illustrated embodiment does not necessarily extend the entire height of the seat 10. The vehicle reinforcing member 26 instead extends, for example, to a shoulder height at which it is anticipated the shoulder of the average height occupant will be positioned when in the seat 10 or as deemed necessary by engineering for the specific seat design.

While the vehicle reinforcing member 26 may extend the full height of the seat 10, in some embodiments, it does not do so presently because much of the weight of an occupant is typically in the occupant's lower torso (e.g. stomach area) and legs. Thus much of the force applied by the occupant to the seat 10 in the event of a rear end collision with the vehicle will be in the lower portion of the seat 10. This is particularly the case since the lap sash of a seatbelt is designed to maintain the occupant's hips close to the region at which the seatback 14 meets the seat portion 12. Accordingly, a greater amount of reinforcement is required in the base of the seatback 14 than at the top of the seatback 14 to control forces from rear end collisions.

Figure 2:
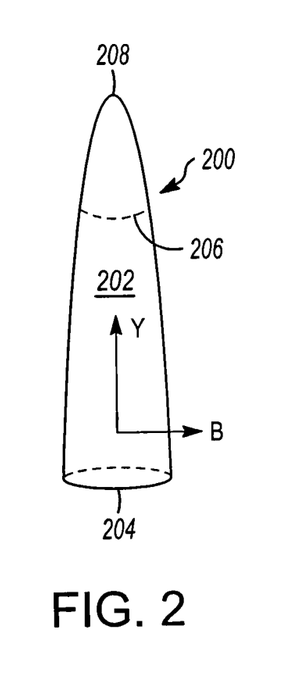
FIG. 2 is a side view of a vehicle reinforcing member in accordance with present teachings.

FIG. 2 provides a side view of a vehicle reinforcing member 200. The vehicle reinforcing member 200 may be suitable for use in, for example, a seatback of a vehicle seat such as in the place of vehicle reinforcing member 26 in FIG. 1. The vehicle reinforcing member 200 comprises a closed cross-section portion 202. The closed cross-section portion 202 extends substantially the full length of the vehicle reinforcing member 200. In some embodiments, the closed cross-section portion 202 may extend less than the full length of the vehicle reinforcing member 200. For example, the closed cross-section portion 202 may extend from a lower end 204, which may be attached to a tilt adjustment member, only part way along the length of the vehicle reinforcing member 200. For example, it may extend from lower end 204 up to upper point 206 that is lower than top-end 208.

The portion of the vehicle reinforcing member 200 between point 206 and end 208 may then comprise only a U-shaped portion or C-shaped portion thereby to provide sufficient structural rigidity to be suitable for purpose, yet not unnecessarily use expensive laminate materials.

The vehicle reinforcing member 200 has an elongate direction. In the present instance that direction follows arrow Y away from the lower end 204. For other vehicle reinforcing members, the longitudinal direction may be other than a straight line. For example, where the vehicle reinforcing member comprises a member with a fixed radius of curvature—such as at the corner of a bumper bar of a car—the longitudinal direction may follow the radius of curvature or compound curvatures (i.e. a curve having more than one radius of curvature, or no fixed radius of curvature).

The vehicle reinforcing member 200 is tapered. The taper extends away from a position near the lower end 204, or near the tilt adjustment member when one is attached to the vehicle reinforcing member 200, in a longitudinal direction of the vehicle reinforcing member 200. Presently, the taper extends substantially the full length of the vehicle reinforcing member 200.

The taper assists withdrawal of the shape defining member (see FIGS. 5a to 5d) from the vehicle reinforcing member 200. That withdrawal occurs, in the present instance, in the longitudinal direction of the vehicle reinforcing member 200. Thus the vehicle reinforcing member 200 can be formed about the shape defining member, and partially cured—set, frozen or otherwise rigidified sufficiently to maintain its shape as the second mould member is withdrawn—and the shape defining member is then withdrawn.

Figure 3:
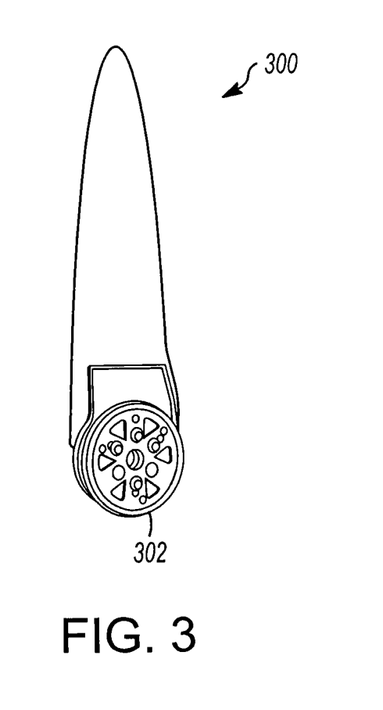
FIG. 3 is a side view of the vehicle reinforcing member of FIG. 2, to which a tilt adjustment member has been attached.

A further embodiment of a vehicle reinforcing member 300 is shown in FIG. 3. In this embodiment, a metal fixture 302 is attached to the vehicle reinforcing member 300. The metal fixture 302 enables the vehicle reinforcing member 300 to be attached to another structure. For example, where the vehicle reinforcing member 300 comprises part of a bumper of a car, the metal fixture 302 may facilitate attachment of the bumper to the body or the chassis of the car. Similarly where the vehicle reinforcing member 300 comprises part of a seat portion of a vehicle seat, the metal fixture 302 may facilitate attachment of the seat portion to the seat base, whether or not that seat base comprises a longitudinal adjustment mechanism per FIG. 1. In the present instance, the vehicle reinforcing member 300 comprises part of a seatback of a vehicle seat and the metal fixture is a tilt adjustment member of a tilt adjustment mechanism enabling the seatback to tilt relative to the seat portion of the vehicle seat. In other words, a cooperating tilt adjustment member is provided on the seat portion of the vehicle seat and the tilt adjustment members are movably connected to each other thereby to connect the seat portion and seatback in a manner that permits the latter to tilt relative to the former.

Figure 4A:
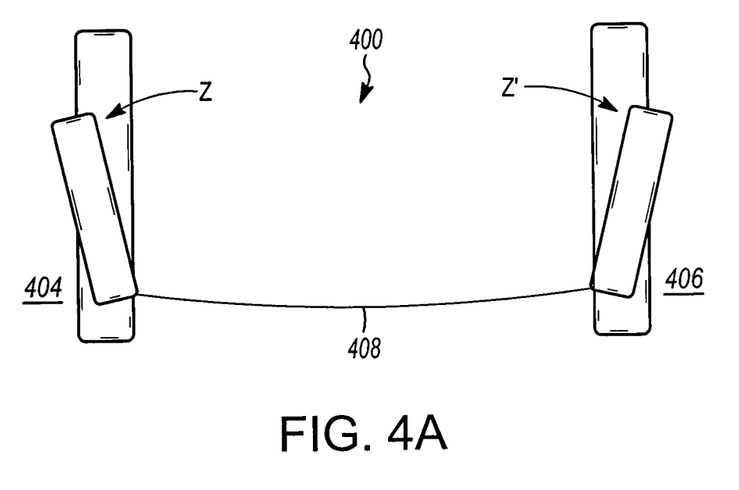
FIGS. 4a and 4b are top views of a vehicle seat, illustrating movement of vehicle reinforcing members during loading.
Figure 4B:
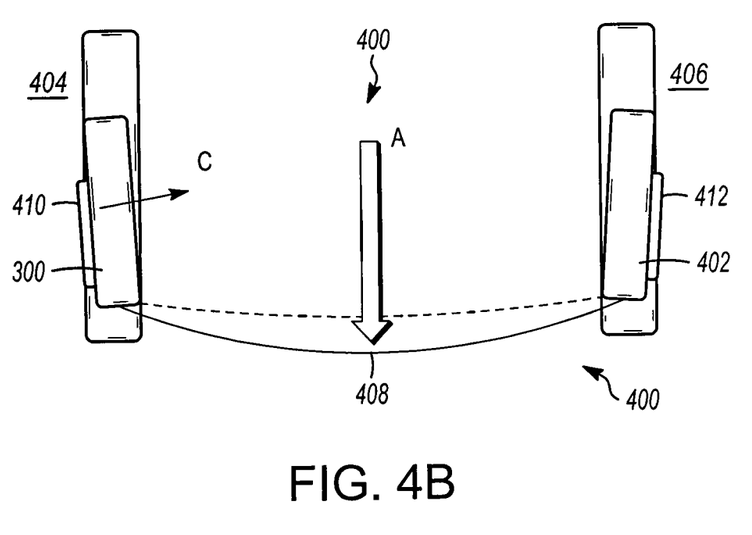

The seatback 400 of which the vehicle reinforcing member 300 comprises a part is shown in FIGS. 4a and 4b. Due to the closed cross-section of the vehicle reinforcing member of the present embodiments, there is no single point, such as an edge, at which load concentrates when compared with open cross-section structural members such as U-shaped or C-shaped members. The closed cross-section of the vehicle reinforcing member 300 thus provides resistance to forces acting on multiple degrees of freedom.

FIG. 4a illustrates the response of the vehicle reinforcing member 300 to torsional force, or a bending moment about a vertical axis (i.e. out of the page on which FIG. 4a is illustrated). Torsional force may occur, for example, during side impact loading of a vehicle or where the seatback is pushed forward. While the vehicle structural reinforcing member may have an elliptical, or substantially elliptical cross-section, or other cross-section (e.g. rectangular or oval), the closed nature of that cross-section results in opposing forces being created—the force in one part of the cross-section is at least partially counteracted by force in another part of the cross-section.

For torsional loads, the resistance tends to be a shear force rather than a tensile or compressive force. Thus two shear force regions are created in the member 300 for applications of torsional force. By generating two shear force regions, the maximum shear is dramatically reduced, and even halved (where the two regions experience equal shear force). This is because the force applying the shear in one region must similarly apply the shear in the other region, so that any force is absorbed in up to twice the number of regions as would be available for open cross-section members such as U-shaped and C-shaped structural members. The result is the closed cross-section ensures any force that would be applied to a U-shaped or C-shaped structural member is opposed and the maximum force is effectively reduced, or even halved. For large impacts, such as during car collisions, this means the impact can be almost twice as hard and apply almost twice the torsional force before the member 300 will experience failure. When considering the regularity of car collisions, less catastrophic collisions occur much more frequently than highly catastrophic collisions. As such, the type of collision member 300 is capable of withstanding is much less likely to occur than other types of collisions. So member 300 is much less likely to experience failure during its useful life than a component formed by different methods. Moreover, as illustrated with reference to FIGS. 4a and 4b, forces are absorbed about multiple degrees of freedom, namely bending about horizontal axes and torsion about a vertical axis.

While the above discussion was made with reference to shear forces applied during torsional loading, a similar force reducing mechanism applies under bending forces applied about horizontal axes. This is due to there being a potential region of compression for any region of tension, and vice versa, generated around the cross-section. The opposed regions of tension and compression may occur on opposite sides of the cross-section, and similarly for the regions of shear.

Notably, the seatback 400 comprises two vehicle reinforcing members 300, 402 extending along opposite sides 404, 406 of the seatback. The present vehicle reinforcing members 300, 402 extend from the tilt adjustment mechanism (see reference 16 in FIG. 1) to a point further away from the tilt adjustment mechanism (see reference 32 in FIG. 1 and reference 208 in FIG. 2). The vehicle reinforcing members 300, 402 extend substantially in parallel.

The vehicle reinforcing members 300, 402 may have the same shape or one may be the mirror image of the other, taken about a plane generally defined by arrows Y and B in FIG. 2. Reinforcing members 300, 402 may also have asymmetrical shapes, as in the case where the outermost member is required to make room for a side-airbag or some other asymmetrical devices as as electronics boxes.

Extending between the two vehicle reinforcing members 300, 402 is a web or shell 408. The web or shell 408 may be attached to the vehicle reinforcing members 300, 402 in any desired manner. In the present case, the web or shell 408 is overmoulded onto the vehicle reinforcing members 300, 402. This overmoulding process integrally connects the web or shell 408, vehicle reinforcing member 300 and further vehicle reinforcing member 402.

The web or shell 408 may also be attached by forming a recess (not shown) in the web or shell, an internal volume of the recess being shaped to substantially conform to an outer shape of the vehicle reinforcing members 300, 402, such that the latter can be received in the former.

There are two vehicle reinforcing members 300, 402. While these vehicle reinforcing members 300, 402 may be attached to a common tilt adjustment mechanism, that mechanism presently comprises two hinge mechanisms 410, 412. One hinge mechanism 410, 412 is on each of the opposite sides 404,406 of the seatback 400.

Each hinge mechanism 410, 412 comprises two tilt adjustment members. One tilt adjustment member of each respective hinge mechanism is attached to the respective vehicle reinforcing member 300, 402. The other tilt adjustment member is attached to the seat portion of the vehicle seat. The tilt adjustment members attached to the seat portion may be separate components or may together form a common seat portion tilt adjustment part. Similarly, the tilt adjustment members attached to the seatback may be separate components or may together form a common seatback tilt adjustment part. In this regard, there may be a tilt adjustment mechanism on only one of the vehicle reinforcing members (e.g. a pair of tilt adjustment members capable of locking together—in other words, a tilt adjustment lock—thereby to lock the seatback in position relative to the base). The other vehicle reinforcing member may be coupled to the base by tilt adjustment members that do not lock but instead form a rotational hinge. There may instead be a single tilt adjustment mechanism attaching both vehicle reinforcing members to the base. All variations of hinge mechanism, tilt adjustment mechanism and tilt adjustment members are intended to fall within the scope of the present disclosure and it will be readily apparent to the skilled person, in view of the present disclosure, how to incorporate those variations into vehicle seats.

Notably, where the seat element is not the seatback but is instead the seat portion, the hinge mechanisms 410, 412 would nevertheless interconnect vehicle reinforcing member 30 (see FIG. 1) with the seatback 400. In this configuration there may be no second vehicle reinforcing member 30. Instead vehicle reinforcing member 30 may extend the full width of the seat portion 12.

FIG. 4b illustrates the response of the vehicle reinforcing member in the event of a rear impact. The arrow A indicates the direction of action of the inertia of a seat occupant. The cross-section of the vehicle reinforcing members 300, 402 is wider in the direction of arrow A (and similarly arrow B in FIG. 2) than in the direction of arrow C. Thus the vehicle reinforcing members 300, 402 provide greater rigidity and force absorption for forces occurring in the plane comprising arrows Y and B (see FIG. 2) than in the plane comprising arrows Y and C (arrow Y extends out of the page on which FIG. 4b is displayed). For this reason, when compared with the response of the vehicle reinforcing members 300, 402 under torsional load, the response (e.g. deformation) under a comparable load in the direction of arrow A is much smaller.

FIGS. 5a to 5d illustrate a method 500 for forming a vehicle reinforcing member, the method broadly comprising:

Step 502 (FIGS. 5a to 5c): conforming a sheet of fibre reinforced material (CFRM) 504 to a shape of a shape defining member 506; and Step 508 (Step 5d): bonding a first edge portion 510 of the CFRM sheet 504 to a second edge portion 512 of the CFRM sheet 504 thereby to form the closed cross-section portion of the vehicle reinforcing member.

Step 502 comprises conforming a sheet of fibre reinforced material 504 to the shape of a shape defining member 506. In order words, the fibre reinforced material 504 is moulded around the shape defining member 506 so that an internal surface of the fibre reinforced material 504 conforms to the shape of an external surface of the shape defining member 506, often referred to as "draping" in the industry. With the sheet of fibre 504 having a substantially uniform thickness, and with the draping process conforming the shape of the sheet of fibre 504 to the shape of the shape defining member 506. For example, if the shape defining member 506 is tapered, the vehicle reinforcing member which is produced by the method illustrated in FIGS. 5a to 5d will be tapered. Likewise, a tapered vehicle reinforcing member may be produced by the method illustrated in FIGS. 5a to 5d only when using a tapered shape defining member 506. The fibre reinforced material is formed from a sheet of continuous fibres in a synthetic matrix. Such materials include continuous fibre reinforced thermoplastics (CFRTs) and notably polyamide compounds and other engineering thermoplastics, or a sheet of continuous fibres in an epoxy-based resin. In some embodiments, the CFRM is a thermoplastic. The material from which the web or shell 408 if formed (i.e. the overmoulded material) should be compatible with the resin of the CFRT matrix to promote bonding between the two.

The shape defining member 506 defines an internal volume of a closed cross-section portion of the vehicle reinforcing member. The CFRM sheet is moulded around the external surface of the shape defining member 506. As such the shape defining member imparts its shape to the internal volume of the CFRM sheet.

In the present case, the shape defining member 506 member has a generally rectangular or trapezoidal cross-section with a beveled corner as shown in FIGS. 5a to 5d. However, other cross-sections may also be appropriate as, for example, illustrated in FIG. 7 and determined by engineering requirements.

The process of conforming the CFRM sheet 504 to the shape defining member 506 is performed by contacting a first mould member 514 with the CFRM sheet 504 and bringing the first mould member 514 and shape defining member 506 together with the CFRM sheet 504 therebetween. In so doing, the CFRM sheet 504 is at least partially conformed to the shape of the shape defining member 506.

The first mould member 514 comprises an inclined surface 516. The inclined surface 516 is at an incline to vertical—vertical being indicated by arrow D in FIG. 5a. In order to shape the CFRM sheet 504 it is loaded onto the inclined surface 516. The incline of the surface 516 serves a number of functions. Firstly, it provides a small amount of friction to maintain the CFRM sheet 504 in position until it is captured between the first mould member 514 and the shape defining member 506. Secondly, there is a concave section or recess 518 in the inclined surface 516. Where a portion 520 of the CFRM sheet 504 protrudes from the upper edge 524 (i.e. the edge of the concave section 528 comprising the highest point on the concave section 528 with respect to vertical) of the concave section 518 as shown in FIG. 5b, the portion 520 will drape, under gravitational force, towards the shape defining member 506—in other words, the portion 520 at least partially moves into conformity with the shape defining member 506. This assists the process of subsequently completing conforming of the CFRM sheet 504 to the shape defining member 506.

Figure 5A:
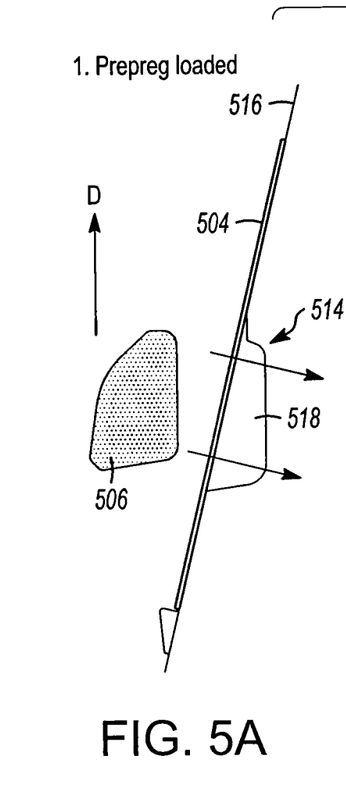
FIGS. 5a to 5d illustrate a method and apparatus for forming vehicle reinforcing members in accordance with present teachings.
Figure 5B:
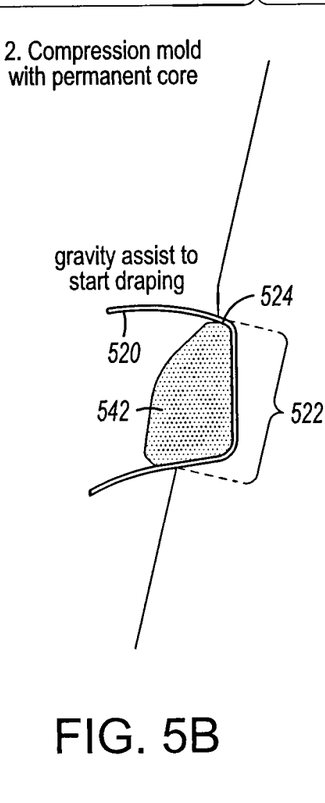

Thus the step shown in FIG. 5a involves loading the CFRM sheet 504 onto the inclined surface 516 before pressing a portion of the CFRM sheet 504 between the shape defining member 506 and first mould member 514.

When the shape defining member 506 and first mould member 514 are brought together, the CFRM sheet 504 is received in the concave section 518 as shown in FIG. 5b. The concave section 518 shaped to cooperate with the shape of the shape defining member 506. As such, the shape of the concave section 518 closely approximates that of the shape defining member 506, there being a tolerance between the two of approximately the thickness of the CFRM sheet 504. Thus when the shape defining member 506 pushes the CFRM sheet 504 into the concave section 518 the CFRM sheet is partially conformed to the shape of the shape defining member (conforming section indicated by reference 520).

Notably, when the first mould member 514 and shape defining member 506 are in the configuration shown in FIG. 5b, portion 520 protrudes from the first mould member 514 and shape defining member 506. To achieve this configuration, the CFRM sheet 504 is positioned or loaded onto the first mould member 514 so that the CFRM sheet 504 overlaps the upper edge 524 of the concave section 518. After the step shown in FIG. 5b the portion 522 remains accessible to perform further process as shown in FIGS. 5c and 5d, such as bonding edges of the CFRM sheet 504.

Figure 5C:
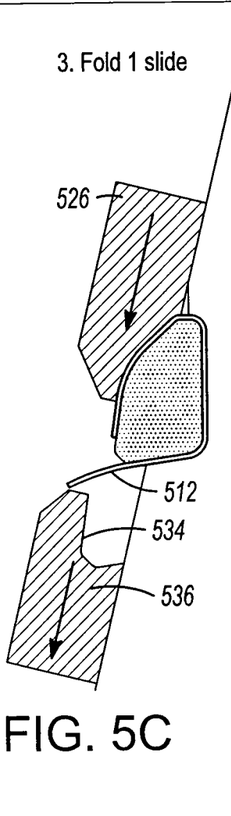

As illustrated in FIG. 5c, a second mould member 526 is brought into contact with the portion 520, to conform portion 520 to the shape of the shape defining member 506. As with the shape of concave section 518, a face 528 of second mould member 526 is shaped to conform closely to the shape of the shape defining member 506. Portion 520 includes first edge portion 510, being one of two edge portions 510, 512 bonded together to form the closed cross-section portion of the vehicle reinforcing member.

The second mould member 526 may contact the first edge portion 510 to press the first edge portion 510 against the shape defining member 506. Alternatively, as shown in FIG. 5c, the first edge portion 510 may not be contacted by the second mould member 526. Instead, the CFRM sheet 504 may be positioned on the first mould member such that, after being conformed to the shape defining member 506 using the first mould member 514 and second mould member 526, portion 520 extends from the second mould member 526 along a substantially flat surface 542 of the shape defining member 506. This may be achieved if the surface lies in a parallel plane with, or is tangential to, the portion of the surface 528 of the second mould member 526 lying immediately inwardly of the leading edge 530 of the second mould member 526. This enables the first edge portion 510 to be positioned against the shape defining member 506 without the second mould member 526 contacting the first edge portion 510. The first edge portion 510 therefore remains exposed and can be bonded to the second edge portion 512 even when the second mould member 526 remains in contact with the CFRM sheet 504.

Figure 5D:
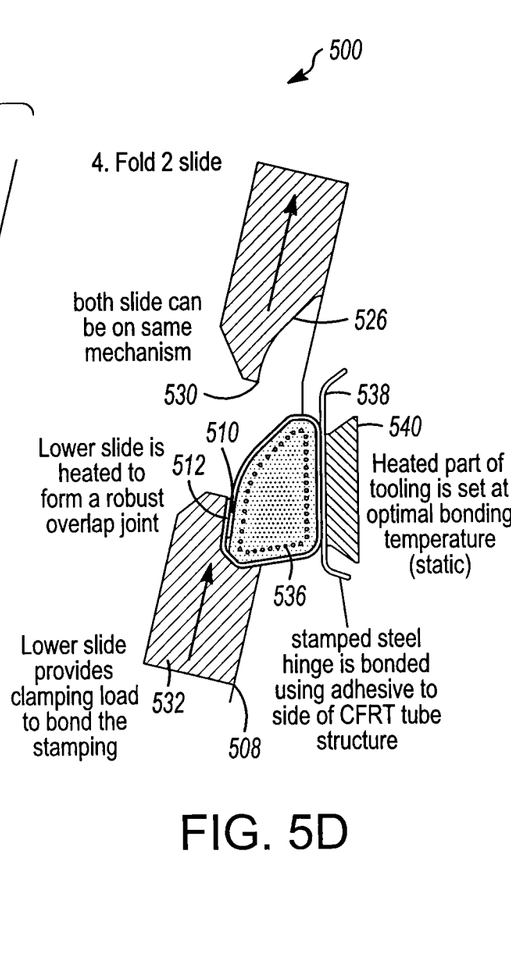

As shown in FIG. 5d, the CFRM sheet 504 is contacted by a third mould member 532. The third mould member 532 pushes the second edge portion 512 against the first edge portion 510 to maintain the first edge portion 510 and second edge portion 512 in contact during bonding. The contact surface 534 of the third mould member 532 is again shaped to conform to the shape of the shape defining member 506.

In contrast to the second mould member 526, the third mould member 532 contacts second edge portion 512 to press the second edge portion 512 against the first edge portion 510 during bonding. To achieve a bond the edge portions 510, 512 are in overlapping configuration or are in any event positioned to form a seam during bonding.

The second mould member 526 and third mould member 532 may be separately mounted with respect to the first mould member 514. In the embodiment shown in FIGS. 5c and 5d they are attached to a reciprocating device (see reference 812 in FIG. 8). The reciprocating device 800 sequentially brings the second mould member 526 into contact with the CFRM sheet 504, then removes the second mould member 526 from contact with the CFRM sheet 504 while bringing the third mould member 532 into contact with the CFRM sheet 504. Thus a single mechanism, reciprocating device 600 controls the sliding movement of the second and third mould member 526, 532 along the first mould member 514.

When loaded onto the first mould member 514, the CFRM sheet 504 is pre-heated to a temperature at which it can be moulded about the shape defining member 506 without damaging the CFRM sheet 504. During moulding, the CFRM sheet 504 will typically cool down. In order to bond first edge portion 510 to second edge portion 512, it is necessary to ensure the temperature of those portions 510, 512 is sufficiently high. This is particularly the case for, for example, co-adhesion bonding—in other words, the bonding of two like materials—and fusion bonding.

The third mould member 532 comprises a heating element 536 in the vicinity of surface 534. The heating element 536 comprises a filament that heats up under electrical load. The heating element may instead comprise another heating arrangement such as conduits for receiving a super-heated fluid. The heating element 536 brings the surface 534 to the requisite bonding temperature of the CFRM sheet 504. Alternatively, the shape forming member 506 and/or mould members 514, 526 may be controllably heated to maintain a temperature of the CFRM sheet 504.

Once the bond is formed, the CFRM sheet 504 is cured or cooled in order to set it in shape. During curing or cooling, for example when the CFRM sheet 504 is partially cured or cooled, the shape defining member 506 can be withdrawn from the CFRM sheet 504. If the shape defining member 506 is withdrawn too early—in other words, before the CFRM sheet 504 has set sufficiently to maintain its shape without the shape defining member 506—the CFRM sheet 504 may collapse. If an attempt is made to withdraw the shape defining member 506 too late, the high strength and rigidity of the cured or cooled vehicle reinforcing component formed from the CFRM sheet 504 may preclude withdrawal of the shape defining member 506.

To precisely control the rate of curing or cooling, the temperature of the shape defining member 506 may be controlled. Controlling the temperature of the shape defining member 506 controls the temperature of the CFRM sheet 504 during curing or cooling. To this end the shape defining member 506 comprises a heating and/or cooling element 536. The heating and/or cooling element may comprise a filament or may comprise a series of conduits or channels through which coolant and/or radiant passes to control the temperature of the shape defining member 506.

The curing or cooling process described above is active cooling—the curing or cooling process is actively controlled. In some embodiments, the curing process may be passive and simply comprise awaiting cooling of the CFRM sheet 504 through heat dissipation to atmosphere and into the shape defining member 506.

In some embodiments, the shape defining member may form part of a component comprising the vehicle reinforcing member. The shape defining member in such embodiments need not be withdrawn from the closed cross-section CFRM vehicle reinforcing member once it has been formed.

As mentioned with reference to FIG. 3, the method described with reference to FIGS. 5a to 5d may involve bonding a metal fixture 538 to the CFRM sheet 504. The metal fixture 538 enables the vehicle reinforcing member formed from the CFRM sheet 504 to be attached to another structure such as a tilt adjustment member of a seat portion.

The metal fixture 538 can be attached using traditional methods, such as riveting, bolting or by shaping the vehicle reinforcing member to enable an interference fit. In FIG. 5d, the metal fixture 538 comprises a tilt adjustment member of a tilt adjustment mechanism, and is pre-treated with an adhesive agent. The adhesive agent is compatible with the metal of the metal fixture 538 and thereby adhesively bonds to the metal fixture 538. The adhesive agent is also compatible with the synthetic matrix of the CFRM sheet 504. Thus the pre-treated metal fixture 538 can be adhesively bonded to the CFRM sheet 504 as shown in FIG. 5d.

To maintain the metal fixture 538 at sufficient temperature to bond with the CFRM sheet 504, the metal fixture is pressed against the CFRM sheet 504 by a heating pad 540 or a heated press commonly used by industry and the utility of which, in the present methods, will become apparent to the skilled person in view of the present disclosure. The temperature of the heating pad 540 is controlled to maintain the desired or optimal joining temperature of the metal fixture 538 during adhesive bonding.

Figure 6:
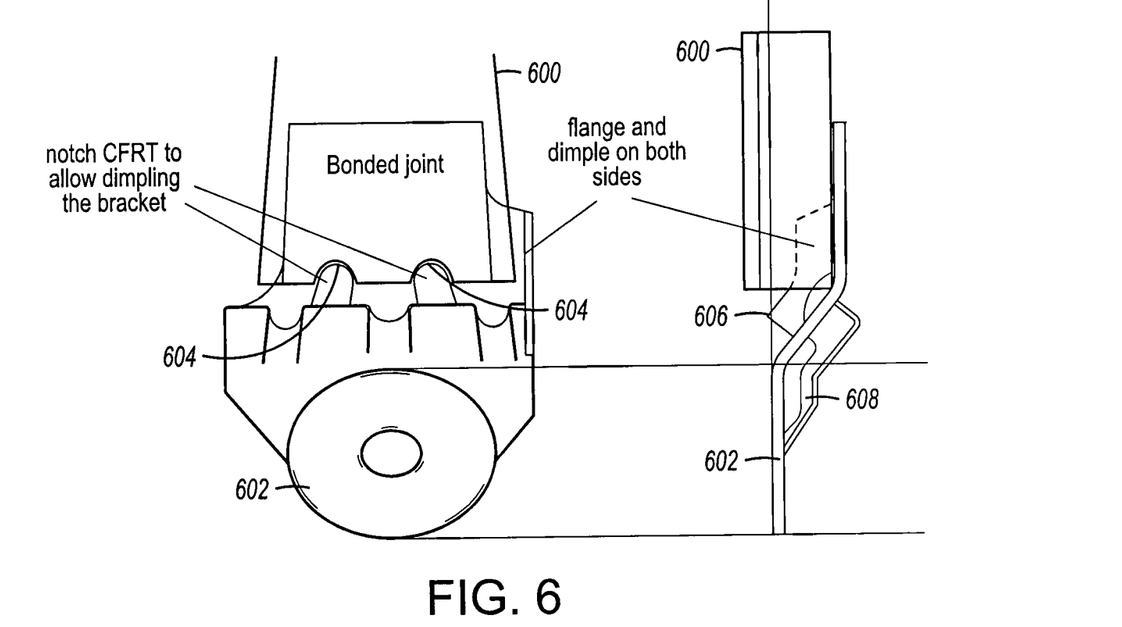
FIG. 6 provides partial close-up views of a bonded joint between a CFRM sheet and a tilt adjustment member.

FIG. 6 shows a close-up example of a joint between a CFRM sheet 600 formed in accordance with the method described with reference to FIGS. 5a to 5d, and a tilt adjustment member 602 (see also reference 18 in FIG. 1). The CFRM sheet 600 has been notched (locations 604) to receive ribs or dimples formed in the tilt adjustment member 602. The tilt adjustment member 602 also includes reinforcing flanges 606, 608 on front and rear surfaces of the tilt adjustment member 602. Various other bracket systems may be used and the shape of the shape defining member and configuration (e.g. notches) of the CFRM sheet to accommodate those brackets systems. The tilt adjustment member 602 can be joined to CFRM structure 600 either externally, as shown in FIG. 6, or to the internal surface of CFRM structure 600 (not shown). The arrangement of the tilt adjustment member 602 and structure 600 will be determined by engineering requirements.

Figure 7:
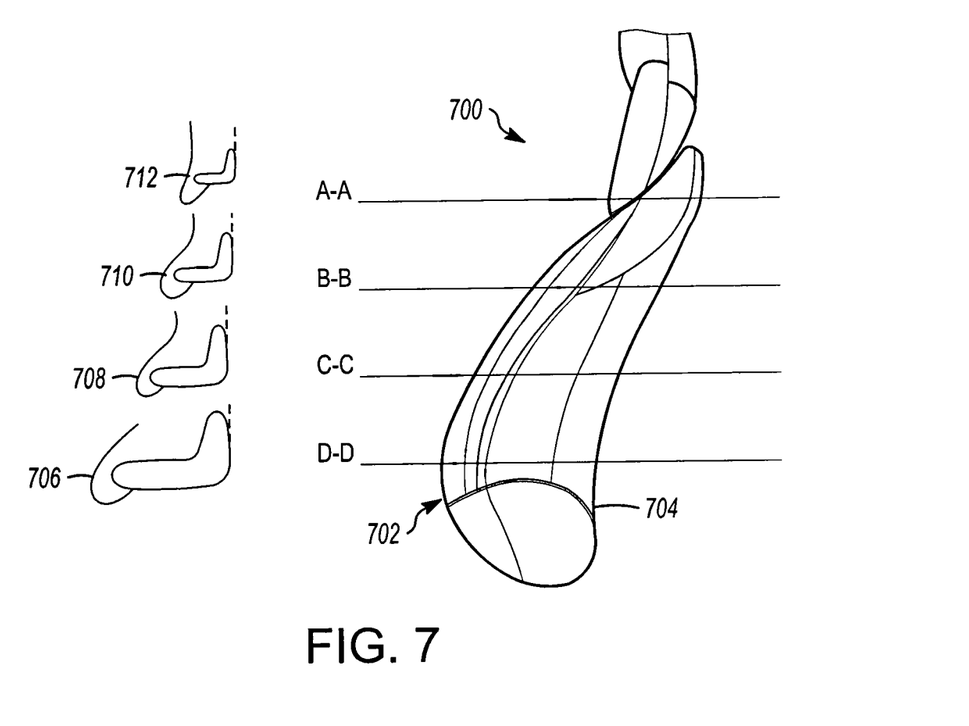
FIG. 7 shows a partial view of a vehicle seat along with various cross-sections taken through the partial vehicle seat, illustrating the variation in dimension of the vehicle reinforcing member along its length.

FIG. 7 provides an alternative embodiment of a vehicle reinforcing member 700 in accordance with present teachings. The member 700 has a substantially L-shaped closed cross-section portion 702. As with vehicle reinforcing member 26 of FIG. 1, member 700 tapers away from its lower end 704. This tapering is indicated by the gradually decreasing cross-section of the L-shaped closed cross-section portion as indicated by reference numerals 706, 708, 710, 712—these cross-sections are taken at locations D-D, C-C, B-B and A-A respectively through member 700.

Figure 8:
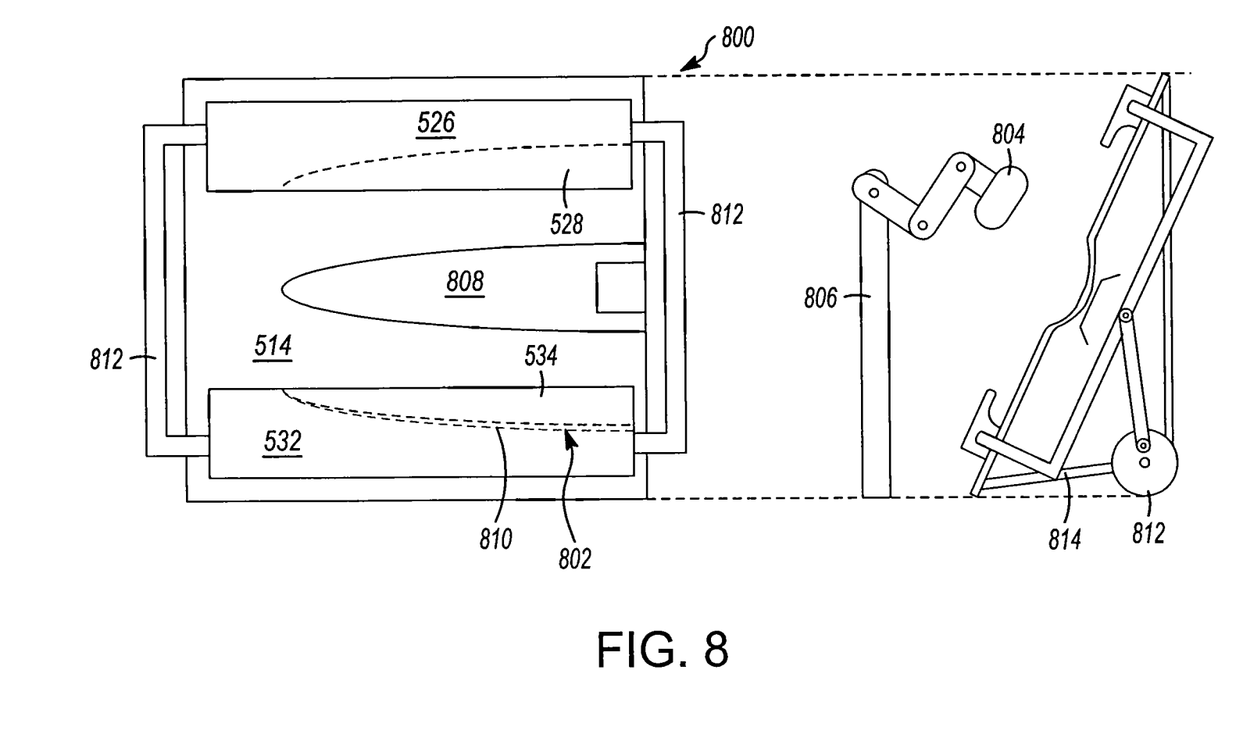
FIG. 8 provides various illustrative views of an apparatus for forming a vehicle reinforcing member in accordance with present teachings.

FIG. 8 shows a system 800 for fabricating a vehicle reinforcing member. The system 800 includes a shape defining member 804, a first mould member 514, and a bonding device 802.

The shape defining member 804 is movable relative to the first mould member 514, to push a sheet of CFRM (not shown) into the concave section 808 of the first mould member 514. The shape defining member 804 is mounted to a robotic (or otherwise automated or remotely controlled) arm 806 that guides movement of the shape defining member 804 into the concave section 808.

The bonding device 802 is movably mounted to the first mould member 514 by a reciprocating frame 812. The reciprocating frame 812 moves the bonding device 802 towards the shape defining member 804 to bond together the first and second edge portions of the CFRM sheet as described above.

The system 800 includes a second mould member 526. The second mould member 526 is movably mounted to the first mould member 514, again by the reciprocating frame 812. Through movement of the reciprocating frame 812 the second mould member 526 is movable to bring the second mould member 526 into contact with the CFRM sheet.

The third mould member 532 comprises the bonding device 802 for bonding the first and second edge portions. Presently, the bonding device 802 comprises the conforming surface 534 of the third mould member 532, and a heating system 810 behind that surface 534. The heating system 810 heats the surface 534 to the bonding temperature of the CFRM sheet.

The reciprocating device or frame 812 is attached to the first mould 514, in the present case by being attached to a frame 814 of the first mould 514. The reciprocating device 812 moves the second and third mould members 526, 532 back and forth, in sliding movement, along a surface (e.g. the inclined surface 516 of FIG. 5a). Under reciprocating motion, the reciprocating device 812, when in use, sequentially brings the second mould member 526 into contact with the first edge portion of a CFRM sheet (not shown), then removes the second mould member 526 from contact with the CFRM sheet and brings the third mould member 532 into contact with a second edge portion of the CFRM sheet to bond the second edge portion to the first edge portion.

Figure 9:
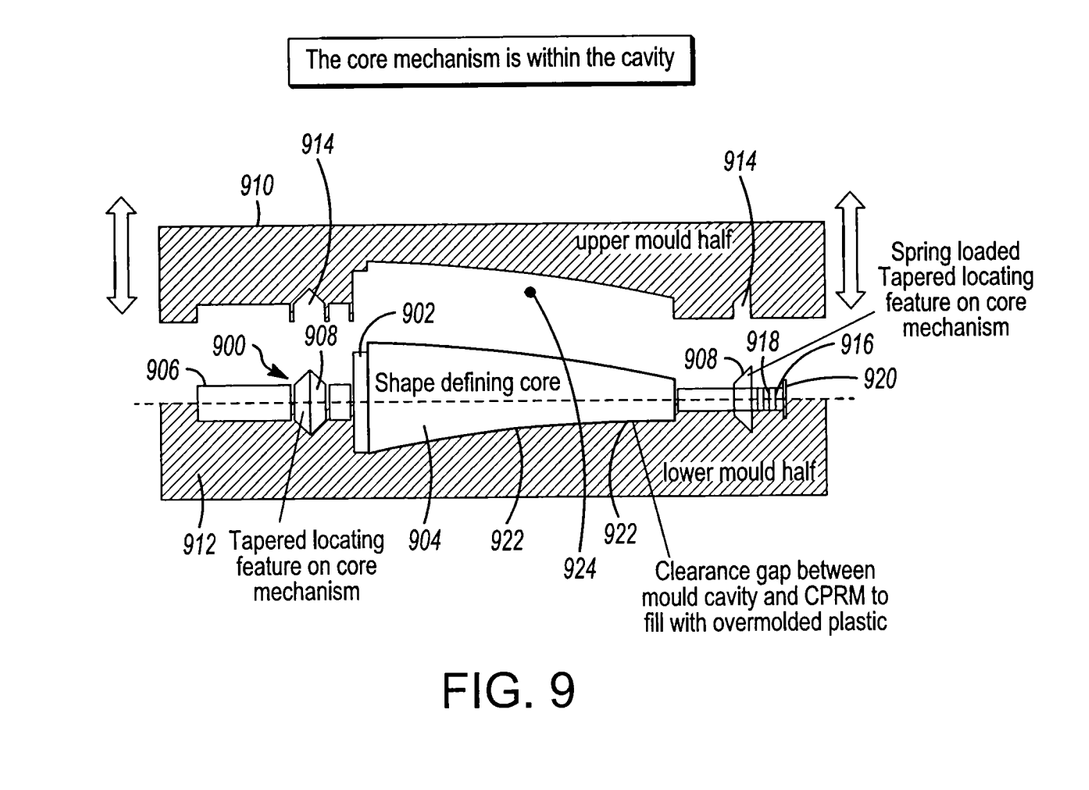
FIG. 9 is a cross-section view through a mould for moulding a web or shell to a vehicle reinforcing member.

FIG. 9 shows a shape defining member 900 in use during an overmoulding process. The shape defining member 900 comprises a core 902 the shape of which corresponds to a shape of an internal volume of the vehicle reinforcing member 904. The shape defining member 900 further includes a shaft 906 on which the core 902 is positioned. The shaft 902 may provide a location for gripping the shape defining member 900.

The shape defining member further includes a pair or locators 908. The locators 908 are located on the shaft 906. The locators 908 are spaced along the shaft 906 away from the core 902. When the shape defining member 900 is positioned in an overmoulding (e.g. injection moulding) mould (formed by mould halves or portions 910, 912) along with the formed vehicle reinforcing member 904, the locators 908 locate into grooves 914, thereby to accurately position the shape defining member 900 relative to the grooves 914. Notably, the triangular shape of the locators 908 and the cooperating shape of the grooves 914 ensures the locators 908 are repeatably accurately centred in the grooves 914.

In this manner the core or member 902 may be centred in the cavity 924. However, the core or member 902 may similarly be located off-centre or otherwise located with respect to the mould 910, 912 in order to achieve the desired thickness and location of the shell or webbing that is to be overmoulded over the member 904.

The shaft 906 is spring loaded at one end 916 so that the shape defining member 900 can be easily positioned in the mould 910, 912, but when the spring 918 biases the end 916 against abutment 920 longitudinal play during the injection moulding or overmould process is prevented.

The halves 910, 912 of the mould have shaped recesses that together form a mould cavity 924. The formed cavity 924 corresponds closely to a shape of the shaft 906 and locators 908, but leaves gaps 922 between the vehicle reinforcing member 904 and the mould when the two halves 910, 912 are brought together. The gaps 922 form the volume into which the compatible overmoulding material will be injected. Whereas the mould members described with reference to FIGS. 5A to 5D may only form a single vehicle reinforcing member in a single moulding process (though any number may be formed, with concave sections being placed at intervals along the first mould member) the present moulding process will require two, pre-formed vehicle reinforcing members 904 to be located in the mould cavity 924 for forming, for example, a seatback frame.

Using this process, the shape defining members remain in the formed vehicle reinforcing members during overmoulding of the web or shell 408. During injection of molten plastic into the mould (910, 912), under pressure, the shape of the pre-formed vehicle reinforcement members 904 is maintained by the shape defining member 900. This also means that if a cooling system is provided in the shape defining member 900 (see reference 536 in FIG. 5*d*) it can also be used to cool the injection moulded plastic in regions around the vehicle reinforcing member 904. This also means the cooling rate of the injection moulded plastic and vehicle reinforcing member 904 can be controlled from within the mould (910, 912) to facilitate withdrawal of the shape defining members 900 (if indeed they are to be withdrawn) as the finished, overmoulded assembly cools, while maintaining dimensional stability—in other words, while preventing collapse of the vehicle reinforcing members until they are cured or cooled to sufficient rigidity to allow withdrawing the shape defining members. The mould (910, 912) may similarly be provided with a cooling system. According to various embodiments, a thermal management system may be provided to make flexible heating/cooling.

According to various embodiments, the vehicle reinforcing member may be tapered, for example in a longitudinal direction of the vehicle reinforcing member.

According to various embodiments, a tapered vehicle reinforcing member may be formed.

According to various embodiments, wherein the shape defining member may be tapered in a longitudinal direction of the shape defining member.

According to various embodiments, the shape defining member may define a tapered internal volume of the closed cross-section portion of the vehicle reinforcing member.

The following examples pertain to further embodiments.

Example 1 is a method for forming a vehicle reinforcing member, the method comprising: conforming a planar body of fibre reinforced material (CFRM) to a shape of a shape defining member, the material comprising continuous fibres in a synthetic matrix and the shape defining member defining an internal volume of a closed cross-section portion of the vehicle reinforcing member; and bonding a first edge portion of the CFRM body to a second edge portion of the CFRM body thereby to form the closed cross-section portion of the vehicle reinforcing member.

In example 2, the subject-matter of example 1 may further include: at least partially curing the conformed CFRM body; and withdrawing the shape defining member from the internal volume of the closed cross-section portion of the vehicle reinforcing member.

In example 3, the subject-matter of any one of examples 1 to 2 may further include that conforming the CFRM body comprises contacting a first mould member with the CFRM body and bringing the first mould member and shape defining member together, with the CFRM body therebetween, to at least partially conform the CFRM to a shape of the shape defining member.

In example 4, the subject-matter of example 3 may further include that the first mould member comprises a surface disposed at an incline to a vertical direction wherein the step of contacting the first mould member with the CFRM body comprises loading the CFRM body onto the inclined surface.

In example 5, the subject-matter of any one of examples 3 to 4 may further include that the first mould member comprises a concave section shaped to cooperate with the shape of the shape defining member, and wherein bringing the first mould member and shape defining member together comprises positioning the CFRM body between the concave section and shape defining member.

In example 6, the subject-matter of example 5 may further include positioning the CFRM body such that the first and second edge portions protrude outside of the concave section.

In example 7, the subject-matter of example 6 may further include that bonding the first edge portion to the second edge portion comprises contacting the CFRM body with a second mould member and third mould member respectively to bring one of the first edge portion and second edge portion against the shape defining member, the second and third edge portion overlapping each other.

In example 8, the subject-matter of example 7 may further include that the third mould member is heated.

In example 9, the subject-matter of example 8 may further include that the third mould member is heated to a bonding temperature of the CFRM.

In example 10, the subject-matter of any one of examples 7 to 9 may further include that the second mould member and third mould member are attached to a reciprocating device, the reciprocating device bringing sequentially the second mould member into contact with the CFRM body, then removing the second mould member from contact with the CFRM body while bringing the third mould member into contact with the CFRM body.

In example 11, the subject-matter of any one of examples 1 to 10 may further include adhesively bonding a metal fixture to the CFRM body, the metal fixture enabling the vehicle reinforcing member to be attached to another structure.

In example 12, the subject-matter of any one of examples 1 to 11 may further include that the vehicle reinforcing member is elongated in a longitudinal direction and the method further comprises withdrawing the second mould member in the longitudinal direction of the vehicle reinforcing member.

In example 13, the subject-matter of any one of examples 1 to 12 may further include that the bonding step comprises bonding the first edge portion and the second edge portion by fusion.

In example 14, the subject-matter of any one of examples 2 to 13 may further include controlling a temperature of the shape defining member thereby to control a rate of curing of the vehicle reinforcing member.

In example 15, the subject-matter of example 14 may further include that the step of controlling the temperature of the shape defining member comprising passing coolant and/or radiant through one or more channels in the shape defining member to control a temperature of the shape defining member and thereby control a temperature of the CFRM body.

Example 16 is a vehicle reinforcing member manufactured using the method of any preceding claim, the vehicle reinforcing member comprising a closed cross-section portion and a seam joining the first and second edge sections.

Example 17 is a method of manufacturing a reinforcing structural member of a vehicle seat, the vehicle seat comprising a seat portion and a seatback connected to the seat portion by a tilt adjustment mechanism, the tilt adjustment mechanism comprising two movably connected tilt adjustment members moveable relative to each other to allow tilt adjustment of the seatback relative to the seat portion, one of the two tilt adjustment members being on each of the seat portion and seatback, the method comprising: forming a vehicle reinforcing member of a seat element using the method of any one of examples 1 to 15, the seat element being one of the seat portion and seatback; and attaching one of the two tilt adjustment members to the vehicle reinforcing member for connecting the vehicle reinforcing member to the other of the two tilt adjustment members and thereby to connect the seat portion and seatback.

In example 18, the subject-matter of example 17 may further include that the attaching step is performed using adhesive bonding.

In example 19, the subject-matter of any one of examples 17 to 18 may further include that the seat element is the seatback, the tilt adjustment mechanism comprises a hinge mechanism on each of two opposed sides of the seatback, one of the hinge mechanisms comprising the tilt adjustment members and the other hinge mechanism also comprising two movably connected tilt adjustment members moveable relative to each other to allow tilt adjustment of the seatback relative to the seat portion, the method comprising: forming a further vehicle reinforcing member in accordance with the method of any one of examples 1 to 15, the vehicle reinforcing member and further vehicle reinforcing member each comprising a tilt adjustment member from the respective hinge mechanism and extending along the two opposed sides of the seatback from the respective hinge mechanism to a point further away from the respective hinge mechanism; and overmoulding a shell onto the vehicle reinforcing member and further vehicle reinforcing member, to integrally connected the shell, vehicle reinforcing member and further vehicle reinforcing member.

Example 20 is a vehicle seat comprising: a seat portion; a seatback; a tilt adjustment mechanism connecting the seatback to the seat portion, the tilt adjustment mechanism comprising two movably connected tilt adjustment members moveable relative to each other to allow tilt adjustment of the seatback relative to the seat portion, one of the two tilt adjustment members being on each of the seat portion and seatback, wherein a seat element, the seat element being one of the seatback and seat portion, comprises at least one vehicle reinforcing member formed using the method of any one of claims 1 to 15, the at least one vehicle reinforcing member comprising one of the tilt adjustment members movably connected to the other tilt adjustment member thereby to connect the seat portion and seatback.

Example 21 is a vehicle seat comprising: a seat portion; a seatback; a tilt adjustment mechanism connecting the seatback to the seat portion, the tilt adjustment mechanism comprising two movably connected tilt adjustment members moveable relative to each other to allow tilt adjustment of the seatback relative to the seat portion, one of the two tilt adjustment members being on each of the seat portion and seatback, wherein a seat element, the seat element being one of the seatback and seat portion, is formed according to the method of any one of claims 19 to 21, the at least one vehicle reinforcing member comprising one of the tilt adjustment members movably connected to the other tilt adjustment member thereby to connect the seat portion and seatback.

In example 22, the subject-matter of any one of examples 20 to 21 may further include that the seat element comprises two vehicle reinforcing members extending along opposite sides of the seat element from the tilt adjustment mechanism to a point further away from the tilt adjustment mechanism.

In example 23, the subject-matter of example 22 may further include that the tilt adjustment mechanism comprises two hinge mechanisms, one hinge mechanism being on each of the opposite sides of the seat element, the tilt adjustment members forming part of one of the two hinge mechanisms, the other hinge mechanism also comprising two movably connected tilt adjustment members moveable relative to each other to allow tilt adjustment of the seatback relative to the seat portion, and wherein each vehicle reinforcing member comprises one of the two tilt adjustment members of the respective hinge.

In example 24, the subject-matter of any one of examples 20 to 23 may further include that a cross-section of the closed cross-section portion of each vehicle reinforcing members is a substantially elliptical.

Example 25 is a system for fabricating a vehicle reinforcing member comprising: a shape defining member defining an internal volume of a closed cross-section portion of the vehicle reinforcing member, the vehicle reinforcing member formed, in use, from a planar body of continuous fibre reinforced material (CFRM) comprising continuous fibres in a synthetic matrix; a first mould member, the first mould member and shape defining member being configured to be brought together to with the CFRM body therebetween, to at least partially conform the CFRM body to the shape defining member; and a bonding device movably mounted to the first mould member and movable towards the shape defining member in use to bond a first edge portion and a second edge portion of the body together to form the vehicle reinforcing member.

In example 26, the subject-matter of example 25 may further include a second mould member movably mounted to the first mould member and movable, in use, to bring the second mould member into contact with the CFRM body to bring a first edge portion of the CFRM body into conformity with the shape defining member.

In example 27, the subject-matter of example 26 may further include a third mould member, the second mould member and third mould member being mounted to a reciprocating device attached to the first mould member, the reciprocating device in use bringing the second mould member into contact with the first edge portion, then removing the second mould member from contact with the first edge portion and bringing the third mould member into contact with a second edge portion of the CFRM body to bond the second edge portion to the first edge portion.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for forming an overmoulded assembly, the method comprising:
    conforming a planar body of fibre reinforced material (CFRM) to a shape of a shape defining member, the material comprising continuous fibres in a synthetic matrix and the shape defining member defining an internal volume of a closed cross-section portion of a vehicle reinforcing member;
    bonding a first edge portion of the CFRM body to a second edge portion of the CFRM body thereby to form, around the shape defining member, the closed cross-section portion of the vehicle reinforcing member; and
    overmoulding a shell onto the vehicle reinforcing member and a further vehicle reinforcing member to integrally connected the shell and CFRM body, while keeping the shape defining member in the closed-cross-section portion,
    wherein conforming the CFRM body comprises contacting a first mould member with the CFRM body and bringing the first mould member and shape defining member together, with the CFRM body therebetween, to at least partially conform the CFRM to a shape of the shape defining member, and the first mould member comprises a surface disposed at an incline to a vertical direction wherein the step of contacting the first mould member with the CFRM body comprises loading the CFRM body onto the inclined surface.

2. The method according to claim 1, wherein the method includes forming a tapered vehicle reinforcing member.

3. The method according to claim 1, wherein the shape defining member is tapered in a longitudinal direction of the shape defining member.

4. The method according to claim 1, wherein the shape defining member defines a tapered internal volume of the closed cross-section portion of the vehicle reinforcing member.

5. The method according to claim 1, further comprising:
    at least partially curing the conformed CFRM body; and
    withdrawing the shape defining member from the internal volume of the closed cross-section portion of the vehicle reinforcing member.

6. The method according to claim 1, wherein the first mould member comprises a concave section shaped to cooperate with the shape of the shape defining member, and wherein bringing the first mould member and shape defining member together comprises positioning the CFRM body between the concave section and shape defining member.

7. The method of claim 6, further comprising positioning the CFRM body such that the first and second edge portions protrude outside of the concave section.

8. The method of claim 7, wherein bonding the first edge portion to the second edge portion comprises contacting the CFRM body with a second mould member and third mould member respectively to bring one of the first edge portion and second edge portion against the shape defining member, the second and third edge portion overlapping each other.

9. The method of claim 8, wherein the third mould member is heated.

10. The method of claim 9, wherein the third mould member is heated to a bonding temperature of the CFRM.

11. The method of claim 8, wherein the second mould member and third mould member are attached to a reciprocating device, the reciprocating device bringing sequentially the second mould member into contact with the CFRM body, then removing the second mould member from contact with the CFRM body while bringing the third mould member into contact with the CFRM body.

12. The method of claim 1, wherein vehicle reinforcing member is elongated in a longitudinal direction and the method further comprises withdrawing the sshape defining member in the longitudinal direction of the vehicle reinforcing member.

13. The method of claim 1, wherein the bonding step comprises bonding the first edge portion and the second edge portion by fusion.

14. The method of claim 1, further comprising controlling a temperature of the shape defining member thereby to control a rate of curing of the vehicle reinforcing member.

15. The method of claim 14, wherein the step of controlling the temperature of the shape defining member comprising passing coolant and/or radiant through one or more channels in the shape defining member to control a temperature of the shape defining member and thereby control a temperature of the CFRM body.

16. An overmoulded assembly manufactured using the method of claim 1, the vehicle reinforcing member comprising a closed cross-section portion and a seam joining the first and second edge sections.

17. A method of manufacturing a reinforcing structural member of a vehicle seat, the vehicle seat comprising a seat portion and a seatback connected to the seat portion by a tilt adjustment mechanism, the tilt adjustment mechanism comprising two movably connected tilt adjustment members moveable relative to each other to allow tilt adjustment of the seatback relative to the seat portion, one of the two tilt adjustment members being on each of the seat portion and seatback, the method comprising:
    forming an overmoulded assembly of a seat element using the method of claim 1, the seat element being one of the seat portion and seatback; and
    attaching one of the two tilt adjustment members to the overmoulded assembly for connecting the overmoulded assembly to the other of the two tilt adjustment members and thereby to connect the seat portion and seatback,
    wherein the seat element is the seatback, the tilt adjustment mechanism comprises a hinge mechanism on each of two opposed sides of the seatback, one of the hinge mechanisms comprising the tilt adjustment members and the other hinge mechanism also comprising two movably connected tilt adjustment members moveable relative to each other to allow tilt adjustment of the seatback relative to the seat portion, the method comprising:
    forming the further vehicle reinforcing member such that the vehicle reinforcing member and further vehicle reinforcing member each comprising a tilt adjustment member from the respective hinge mechanism and extending along the two opposed sides of the seatback from the respective hinge mechanism to a point further away from the respective hinge mechanism; and
    overmoulding the shell onto the vehicle reinforcing member and further vehicle reinforcing member, to integrally connected the shell, vehicle reinforcing member and further vehicle reinforcing member.

18. A vehicle seat, comprising:
    a seat portion;
    a seatback; and a tilt adjustment mechanism connecting the seatback to the seat portion, the tilt adjustment mechanism comprising two movably connected tilt adjustment members moveable relative to each other to allow tilt adjustment of the seatback relative to the seat portion, one of the two tilt adjustment members being on each of the seat portion and seatback, wherein a seat element, the seat element being one of the seatback and seat portion, comprises at least one overmoulded assembly formed using the method of claim 1, the at least one overmoulded assembly comprising one of the tilt adjustment members movably connected to the other tilt adjustment member thereby to connect the seat portion and seatback, wherein the seat element comprises an overmoulded assembly with two vehicle reinforcing members extending along opposite sides of the seat element from the tilt adjustment mechanism to a point further away from the tilt adjustment mechanism.

19. The vehicle seat according to claim 18, wherein the tilt adjustment mechanism comprises two hinge mechanisms, one hinge mechanism being on each of the opposite sides of the seat element, the tilt adjustment members forming part of one of the two hinge mechanisms, the other hinge mechanism also comprising two movably connected tilt adjustment members moveable relative to each other to allow tilt adjustment of the seatback relative to the seat portion, and wherein each vehicle reinforcing member comprises one of the two tilt adjustment members of the respective hinge.

20. The vehicle seat according to claim 18, wherein a cross-section of the closed cross-section portion of each vehicle reinforcing members is a substantially elliptical.

21. A system for fabricating an overmoulded assembly comprising:
- a shape defining member defining an internal volume of a closed cross-section portion of a vehicle reinforcing member, the vehicle reinforcing member formed, in use, from a planar body of continuous fibre reinforced material (CFRM) comprising continuous fibres in a synthetic matrix;
- a first mould member, the first mould member and shape defining member being configured to be brought together to with the CFRM body therebetween, to form a closed cross-section portion from the CFRM body, the closed cross-section portion being formed around the shape defining member;
- a bonding device movably mounted to the first mould member and movable towards the shape defining member in use to bond a first edge portion and a second edge portion of the CFRM body together to form the vehicle reinforcing member; and
- an overmoulding mould for use in overmoulding a shell onto the vehicle reinforcing member and a further vehicle reinforcing member to integrally connected the shell and CFRM body, while keeping the tapered shape defining member in the closed-cross-section portion.

22. The system according to claim 21, wherein the system is configured to fabricate a tapered vehicle reinforcing member.

23. The system according to claim 21, wherein the shape defining member is tapered in a longitudinal direction of the shape defining member.

24. The system according to claim 21, wherein the shape defining member defines a tapered internal volume of the closed cross-section portion of the vehicle reinforcing member.

25. The system according to claim 21, further comprising a second mould member movably mounted to the first mould member and movable, in use, to bring the second mould member into contact with the CFRM body to bring a first edge portion of the CFRM body into conformity with the shape defining member.

26. The system of claim 25, further comprising a third mould member, the second mould member and third mould member being mounted to a reciprocating device attached to the first mould member, the reciprocating device in use bringing the second mould member into contact with the first edge portion, then removing the second mould member from contact with the first edge portion and bringing the third mould member into contact with a second edge portion of the CFRM body to bond the second edge portion to the first edge portion.

* * * * *

UNITED STATES PATENT AND TRADEMARK OFFICE
CERTIFICATE OF CORRECTION

PATENT NO. : 10,800,302 B2
APPLICATION NO. : 16/097462
DATED : October 13, 2020
INVENTOR(S) : Shum Page 1 of 2

It is certified that error appears in the above-identified patent and that said Letters Patent is hereby corrected as shown below:

On the Title Page

Column 1, Item (51), under "Int. Cl.", Lines 1-2, delete
"*B60N 2/70* (2006.01)
*B60N 2/68* (2006.01)" and insert -- *B60N 2/70* (2006.01) --.

On Page 2, Column 1, Item (51), under "Int. Cl.", Lines 1-16, delete
"*B29C 53/42* (2006.01)
*B29C 53/82* (2006.01)
*B29C 70/72* (2006.01)
*B29C 53/46* (2006.01)
*B29C 45/14* (2006.01)
*B60N 2/22* (2006.01)
*B60N 2/42* (2006.01)
*B29C 70/00* (2006.01)
*B29C 33/76* (2006.01)
*B29C 53/84* (2006.01)
*B60N 2/20* (2006.01)
*B60N 2/64* (2006.01)
*B29L 31/00* (2006.01)
*B29K 105/08* (2006.01)
*B29K 105/10* (2006.01)
*B29L 31/30* (2006.01)".

In the Specification

In Column 2, Lines 14-15, "a first mould member, the first mould member" should read -- a first mould member --.

Signed and Sealed this
Ninth Day of March, 2021

Drew Hirshfeld
*Performing the Functions and Duties of the
Under Secretary of Commerce for Intellectual Property and
Director of the United States Patent and Trademark Office*

In Column 3, Line 42, delete "a first mould member, the first mould member" should read -- a first mould member --.

In Column 4, Line 66, "for example" should read -- for example, --.

In Column 7, Line 44, "Similarly" should read -- Similarly, --.

In Column 8, Line 64, "as as" should read -- as --.

In Column 12, Line 44, "for example" should read -- for example, --.

In Column 15, Line 45, "for example" should read -- for example, --.

In Column 18, Lines 39-40, "a first mould member, the first mould member" should read -- a first mould member --.

In the Claims

In Column 20, Claim 12, Line 6, "of" should read -- according to --;

In Column 20, Claim 12, Line 8, delete "sshape" should read -- shape --;

In Column 20, Claim 13, Line 11, "of" should read -- according to --;

In Column 20, Claim 14, Line 14, "of" should read -- according to --.

In Column 21, Claim 21, Line 42, "a first mould member, the first mould member" should read -- a first mould member --.

In Column 22, Claim 21, Line 2, "a closed" should read -- the closed --.